US006809312B1

(12) United States Patent
Park et al.

(10) Patent No.: US 6,809,312 B1
(45) Date of Patent: Oct. 26, 2004

(54) IONIZATION SOURCE CHAMBER AND ION BEAM DELIVERY SYSTEM FOR MASS SPECTROMETRY

(75) Inventors: Melvin A. Park, Billerica, MA (US); Houle Wang, Billerica, MA (US)

(73) Assignee: Bruker Daltonics, Inc., Billerica, MA (US)

( * ) Notice: Subject to any disclaimer, the term of this patent is extended or adjusted under 35 U.S.C. 154(b) by 0 days.

(21) Appl. No.: 09/570,797

(22) Filed: May 12, 2000

(51) Int. Cl.[7] ........................ B01D 59/44; B01D 49/00; B01D 49/26; H01J 49/40

(52) U.S. Cl. ........................ 250/281; 250/282; 250/287; 250/288; 250/289

(58) Field of Search .................................. 250/281–296

(56) References Cited

U.S. PATENT DOCUMENTS

| | | | | | |
|---|---|---|---|---|---|
| 4,403,147 | A | | 9/1983 | Melera et al. | |
| 4,963,736 | A | | 10/1990 | Douglas et al. | |
| 5,030,826 | A | | 7/1991 | Hansen | |
| 5,179,278 | A | | 1/1993 | Douglas | |
| 5,304,798 | A | | 4/1994 | Tomany et al. | |
| 5,306,910 | A | | 4/1994 | Jarrell et al. | |
| 5,432,343 | A | | 7/1995 | Gulcicek et al. | |
| 5,436,446 | A | | 7/1995 | Jarrell et al. | |
| 5,495,108 | A | | 2/1996 | Apffel, Jr. et al. | |
| 5,652,427 | A | | 7/1997 | Whitehouse et al. | |
| 5,689,111 | A | | 11/1997 | Dresch et al. | |
| 5,708,268 | A | | 1/1998 | Franzen | |
| 5,736,741 | A | | 4/1998 | Bertsch et al. | |
| 5,739,530 | A | | 4/1998 | Franzen et al. | |
| 5,750,988 | A | | 5/1998 | Apffel et al. | |
| 5,753,910 | A | | 5/1998 | Gourley et al. | |
| 5,767,512 | A | * | 6/1998 | Eiden et al. | 250/282 |
| 5,811,800 | A | | 9/1998 | Franzen et al. | |
| 5,825,026 | A | | 10/1998 | Baykut | |
| 5,838,003 | A | | 11/1998 | Bertsch et al. | |
| 5,852,294 | A | | 12/1998 | Gulcicek et al. | |
| 5,962,851 | A | * | 10/1999 | Whitehouse et al. | 250/287 |
| 6,011,259 | A | * | 1/2000 | Whitehouse et al. | 250/287 |
| 6,040,575 | A | * | 3/2000 | Whitehouse et al. | 250/282 |
| 6,107,623 | A | * | 8/2000 | Bateman et al. | 250/282 |
| 6,121,607 | A | * | 9/2000 | Whitehouse et al. | 250/282 |
| 6,188,066 | B1 | * | 2/2001 | Whitehouse et al. | 250/281 |
| 6,204,500 | B1 | * | 3/2001 | Whitehouse et al. | 250/282 |
| 6,251,218 | B1 | * | 6/2001 | Fujisawa et al. | 156/345.39 |
| 6,259,091 | B1 | * | 7/2001 | Eiden et al. | 250/281 |
| 6,285,027 | B1 | * | 9/2001 | Chernushevich et al. | 250/287 |
| 6,403,953 | B2 | * | 6/2002 | Whitehouse et al. | 250/281 |
| 6,525,313 | B1 | * | 2/2003 | Park | 250/281 |

OTHER PUBLICATIONS

McIver, Jr. et al., "Matrix–assisted Laser Desorption/Ionization with an External Ion Source Fourier–transform Mass Spectrometer" Rapid Commun. Mass Spectrom. vol. 8, 237–241 (1994).

Xu et al., "A New Cooling and Focusing Device for Ion Guide," Nuclear Inst. Meth. Phys. Res. 333, 274–281 (1993).

Boyle et al., "An Ion–storage Time–of–flight Mass Spectrometer for Analysis of Electrospray Ions," Rapid Commun. Mass Spectrom, vol. 5, 400–405 (1991).

(List continued on next page.)

*Primary Examiner*—John R. Lee
*Assistant Examiner*—Bernard E. Souw
(74) *Attorney, Agent, or Firm*—Ward & Olivo

(57) ABSTRACT

The present invention is for an improved ionization source chamber and ion beam delivery system which includes a vacuum chamber and flange arrangement, for mounting the means for transferring sample ions from the port to a mass analyzer and for mounting the ion production means, respectively. The flange containing the ion production means may be attached to the vacuum chamber via a hinge such that the flange can open as a door to provide easy access to the ion transfer electrodes in the vacuum chamber. Further, a variety of different ion production means may be mounted on the flange of the ionization source chamber of the present invention. As a result, any ion production means may be used with the present invention by substituting a flange which includes the desired ion production means.

51 Claims, 6 Drawing Sheets

OTHER PUBLICATIONS

Shaffer et al. "A Novel Ion Funnel for Focusing Ions at Elevated Pressure Using Electrospray Ionization Mass Spectrometry," Rapid Commun. Mass Spectrom. vol. 11, 1813–1817 (1997).

Tolmachev et al. "Ion Focusing Characteristics of the Stacked Ring 'Ion Funnel' Operating at Elevated Pressures," Proceedings of the 47th ASMS Conference on Mass Spectrometry and Allied Topics, 1999.

* cited by examiner

IONIZATION SOURCE CHAMBER AND ION BEAM DELIVERY SYSTEM FOR MASS SPECTROMETRY

TECHNICAL FIELD OF THE INVENTION

The present invention relates generally to mass spectrometry and the analysis of chemical samples, and more particularly to ionization source chambers and ion beam delivery systems used in mass spectrometry. An apparatus for an ionization source chamber and ion beam delivery system is described for the generation of ions from a sample for subsequent analysis in a mass spectrometer.

BACKGROUND OF THE PRESENT INVENTION

The present invention relates in general to ionization source chambers and ion beam delivery systems for use in mass spectrometry, and more particularly to an ionization source chambers and ion beam delivery system having improved flexibility and accessability over prior art sources. The apparatus and method for ionization described herein are enhancements of the techniques that are referred to in the literature relating to mass spectrometry.

Mass spectrometry is an important tool in the analysis of a wide range of chemical compounds. Specifically, mass spectrometers can be used to determine the molecular weight of sample compounds. The analysis of samples by mass spectrometry consists of three main steps—formation of gas phase ions from sample material, mass analysis of the ions to separate the ions from one another according to ion mass, and detection of the ions. A variety of means exist in the field of mass spectrometry to perform each of these three functions. The particular combination of means used in a given spectrometer determine the characteristics of that spectrometer.

To mass analyze ions, for example, one might use a magnetic (B) or electrostatic (E) analyzer. Ions passing through a magnetic or electrostatic field will follow a curved path. In a magnetic field the curvature of the path will be indicative of the momentum-to-charge ratio of the ion. In an electrostatic field, the curvature of the path will be indicative of the energy-to-charge ratio of the ion. If magnetic and electrostatic analyzers are used consecutively, then both the momentum-to-charge and energy-to-charge ratios of the ions will be known and the mass of the ion will thereby be determined. Other mass analyzers are the quadrupole (Q), the ion cyclotron resonance (ICR), the time-of-flight (TOF), and the quadrupole ion trap analyzers.

Before mass analysis can begin, however, gas phase ions must be formed from sample material. If the sample material is sufficiently volatile, ions may be formed by electron impact (EI) or chemical ionization (CI) of the gas phase sample molecules. For solid samples (e.g. semiconductors, or crystallized materials), ions can be formed by desorption and ionization of sample molecules by bombardment with high energy particles. Secondary ion mass spectrometry (SIMS), for example, uses keV ions to desorb and ionize sample material. In the SIMS process a large amount of energy is deposited in the analyte molecules. As a result, fragile molecules will be fragmented. This fragmentation is undesirable in that information regarding the original composition of the sample —e.g., the molecular weight of sample molecules—will be lost.

For more labile, fragile molecules, other ionization methods now exist. The plasma desorption (PD) technique was introduced by Macfarlane et al. in 1974 (Macfarlane, R. D.; Skowronski, R. P.; Torgerson, D. F., *Biochem. Biophys. Res Commoun.* 60 (1974) 616). Macfarlane et al. discovered that the impact of high energy (MeV) ions on a surface, like SIMS would cause desorption and ionization of small analyte molecules, however, unlike SIMS, the PD process results also in the desorption of larger, more labile species—e.g., insulin and other protein molecules.

Lasers have been used in a similar manner to induce desorption of biological or other labile molecules. See, for example, VanBreeman, R. B.: Snow, M.: Cotter, R. J., *Int. J. Mass Spectrom. Ion Phys.* 49 (1983) 35; Tabet, J. C.; Cotter, R. J., *Anal. Chem.* 56 (1984) 1662; or Olthoff, J. K.; Lys, I.: Demirev, P.: Cotter, R. *J., Anal. Instrument.* 16 (1987) 93. Cotter et al. modified a CVC 2000 time-of-flight mass spectrometer for infrared laser desorption of involatile biomolecules, using a Tachisto (Needham, Mass.) model 215G pulsed carbon dioxide laser. The plasma or laser desorption and ionization of labile molecules relies on the deposition of little or no energy in the analyte molecules of interest. The use of lasers to desorb and ionize labile molecules intact was enhanced by the introduction of matrix assisted laser desorption ionization (MALDI) (Tanaka, K.; Waki, H.; Ido, Y.; Akita, S.; Yoshida, Y.; Yoshica, T., *Rapid Commun. Mass Spectrom.* 2 (1988) 151 and Karas, M.; Hillenkamp, F., *Anal. Chem.* 60 (1988) 2299). In the MALDI process, an analyte is dissolved in a solid, organic matrix. Laser light of a wavelength that is absorbed by the solid matrix but not by the analyte is used to excite the sample. Thus, the matrix is excited directly by the laser, and the excited matrix sublimes into the gas phase carrying with it the analyte molecules. The analyte molecules are then ionized by proton, electron, or cation transfer from the matrix molecules to the analyte molecules. This process, MALDI, is typically used in conjunction with time-of-flight mass spectrometry (TOFMS) and can be used to measure the molecular weights of proteins in excess of 100,000 daltons.

Atmospheric pressure ionization (API) includes a number of methods. Typically, analyte ions are produced from liquid solution at atmospheric pressure. One of the more widely used methods, known as electrospray ionization (ESI), was first suggested by Dole et al. (M. Dole, L. L. Mack, R. L. Hines, R. C. Mobley, L. D. Ferguson, M. B. Alice, *J. Chem. Phys.* 49, 2240, 1968). In the electrospray technique, analyte is dissolved in a liquid solution and sprayed from a needle. The spray is induced by the application of a potential difference between the needle and a counter electrode. The spray results in the formation of fine, charged droplets of solution containing analyte molecules. In the gas phase, the solvent evaporates leaving behind charged, gas phase, analyte ions. Very large ions can be formed in this way. Ions as large as 1 MDa have been detected by ESI in conjunction with mass spectrometry (ESMS).

ESMS was introduced by Yamashita and Fenn (M. Yamashita and J. B. Fenn, *J. Phys. Chem.* 88, 4671, 1984). To establish this combination of ESI and MS, ions had to be formed at atmospheric pressure, and then introduced into the vacuum system of a mass analyzer via a differentially pumped interface. The combination of ESI and MS afforded scientists the opportunity to mass analyze a wide range of samples. ESMS is now widely used primarily in the analysis of biomolecules (e.g. proteins) and complex organic molecules.

In the intervening years a number of means and methods useful to ESMS and API-MS have been developed. Specifically, much work has focused on sprayers and ionization chambers. In addition to the original electrospray technique, pneumatic assisted electrospray, dual electrospray, and nano electrospray are now also widely available. Pneumatic assisted electrospray (A. P. Bruins, T. R. Covey, and J. D. Henion, Anal. Chem. 59, 2642, 1987) uses nebulizing gas flowing past the tip of the spray needle to assist in the formation of droplets. The nebulization gas assists in the formation of the spray and thereby makes the operation of the ESI easier. Nano electrospray (M. S. Wilm, M. Mann, *Int. J. Mass Spectrom. Ion Processes* 136, 167, 1994) employs a much smaller diameter needle than the original electrospray. As a result the flow rate of sample to the tip is lower and the droplets in the spray are finer. However, the ion signal provided by nano electrospray in conjunction with MS is essentially the same as with the original electrospray. Nano electrospray is therefore much more sensitive with respect to the amount of material necessary to perform a given analysis.

For example, FIG. 1 depicts a conventional mass spectrometer using an ESI ion source. Ions are produced from sample material in an ionization chamber 4. Sample solution enters the ionization chamber through a spray needle 5, at the end of which the solution is formed into a spray of fine droplets 11. The spray is formed as a result of an electrostatic field applied between the spray needle 5 and a sampling orifice 7. The sampling orifice may be an aperture, capillary, or other similar inlet leading into the vacuum chambers (1,2 & 3) of the mass spectrometer. Electrosprayed droplets evaporate while in the ionization chamber thereby producing gas phase analyte ions. In addition, heated drying gas may be used to assist the evaporation of the droplets. Some of the analyte ions are carried with the gas from the ionization chamber 4 through the sampling orifice 7 and into the vacuum system (comprising vacuum chambers 1, 2 & 3) of the mass spectrometer. With the assistance of electrostatic lenses and/or RF driven ion guides 9, ions pass through a differential pumping system (which includes vacuum chambers 1, 2 & 3 and lens/skimmer 8) before entering the high vacuum region 1 wherein the mass analyzer (not shown) resides. Once in the mass analyzer, the ions are mass analyzed to produce a mass spectrum.

Many other ion production methods might be used at atmospheric or elevated pressure. For example, MALDI has recently been adapted by Victor Laiko and Alma Burlingame to work at atmospheric pressure (Atmospheric Pressure Matrix Assisted Laser Desorption Ionization, poster #1121, 4$^{th}$ International Symposium on Mass Spectrometry in the Health and Life Sciences, San Francisco, Aug. 25–29, 1998) and by Standing et al. at elevated pressures (Time of Flight Mass Spectrometry of Biomolecules with Orthogonal Injection+, Collisional Cooling, poster #1272, 4$^{th}$ International Symposium on Mass Spectrometry in the Health and Life Sciences, San Francisco, Aug. 25–29, 1998; and Orthogonal Injection TOFMS *Anal. Chem.* 71(13), 452A (1999)). The benefit of adapting ion sources in this manner is that the ion optics and mass spectral results are largely independent of the ion production method used.

An elevated pressure ion source always has an ion production region (wherein ions are produced) and an ion transfer region (wherein ions are transferred through differential pumping stages and into the mass analyzer). The ion production region is at an elevated pressure—most often atmospheric pressure—with respect to the analyzer. The ion production region will often include an ionization “chamber”. In an ESI source, for example, liquid samples are “sprayed” into the “chamber” to form ions.

The design of the ionization chamber used in conjunction with atmospheric pressure ionization mass spectrometry (API-MS) has had a significant impact on the availability and use of these ionization methods with MS. Prior art ionization chambers are inflexible to the extent that a given ionization chamber can be used readily with only a single ionization method and a fixed configuration of sprayers. For example, in order to change from a simple electrospray method to a nano electrospray method of ionization, one had to remove the electrospray ionization chamber from the source and replace it with a nano electrospray chamber (see also, Gourley et al. U.S. Pat. No. 5,753,910 (Gourley et al.), entitled Angled Chamber Seal for Atmospheric Pressure Ionization Mass Spectrometry).

The ion transfer region will generally include a multipole RF ion guide. Ion guides have been shown to be effective in cooling ions and in transferring them from one pressure region to another in a differentially pumped system. For example, ions may be produced by ESI or APCI at substantially atmospheric pressure. These ions are transferred from atmospheric pressure to a first differential pumping region by the gas flow through a glass capillary. Ions are directed from this first pumping region to a second pumping region by an electric field and by gas flow through a “skimmer”. A multipole in the second differentially pumped region accepts the ions and guides them through a restriction and into a third differentially pumped region. Meanwhile, collisions with gas flowing through the multipole “cools” the ions resulting in both more efficient ion transfer and the formation of a cool ion beam—which is more readily mass analyzed.

Depicted in FIG. 2 is a prior art ion source as described in Whitehouse et al. U.S. Pat. No. 5,652,427 (Whitehouse et al.). As discussed above with respect to FIG. 1, ions are formed from sample solution by an electrospray process when a potential is applied between sprayer 12 and sampling orifice 13. According to this prior art design shown in FIG. 2, a capillary is used to transport ions from atmospheric pressure where the ions are formed to a first pumping region 53. Lenses 47, 51, and 53' are used to guide the ions from the exit of the capillary 50 to the mass analyzer 57 in the mass analysis region 54—in this case a quadrupole mass analyzer. Between lenses 47 and 53', an RF only hexapole ion guide 40 is used to guide ions through differential pumping stages 41 and 42 to exit 52 and into mass analysis region 54 through orifice 47. The hexapole ion guide 40, according to this prior art design, is intended to provide forth efficient transport of ions from one location—i.e. the entrance 48 of lens/skimmer 47—to a second location—i.e. exit 52. Further, through collisions with rest gas in the hexapole, ions are cooled to thermal velocities.

In the scheme of Whitehouse et al., an RF only potential is applied to the multipole. As a result, the multipole is not “selective” but rather transmits ions over a broad range of mass-to-charge (m/z) ratios. Such a range as provided by a prior art multipole is adequate for many applications, however, for some applications—particularly with MALDI—the ions produced may be well out of this range. High m/z ions such as are often produced by the MALDI ionization method are often out of the range of transmission of prior art multipoles.

In other schemes a multipole might be used to guide ions of a selected m/z through the transfer region. For example, Morris et al., in H. R. Morris et al., High Sensitivity Collisionally-Activated Decomposition Tandem Mass Spectrometry on a Novel Quadrupole/Orthogonal-Acceleration Time-of-Flight Mass Spectrometer, *Rapid Commun. Mass Spectrom.* 10, 889 (1996), use a series of multipoles in their design. One of these is a quadrupole. The quadrupole can be run in a "wide bandpass" mode or a "narrow bandpass" mode. In the wide bandpass mode, an RF-only potential is applied to the quadrupole and ions of a relatively broad range of m/z values are transmitted. In narrow bandpass mode both RF and DC potentials are applied to the quadrupole such that ions of only a narrow range of m/z values are selected for transmission through the quadrupole. In subsequent multipoles, the selected ions may be activated towards dissociation. In this way the instrument of Morris et al. is able to perform MS/MS with the first mass analysis and subsequent fragmentation occurring in what would otherwise be simply a set of multipole ion guides.

FIG. 3 depicts such a prior art source design according to Morris et al. This prior art design is similar to that of Whitehouse et al. (as shown in FIG. 2), except that the multipole source design according to Morris et al., four RF multipoles (i.e., 14–17) are used. The first multipole encountered by the ions is hexapole 14. It is used in a manner similar to the design of Whitehouse et al. to cool and guide the ions. The second multipole encountered is quadrupole 15. Quadrupole 15 can be used in a wide bandpass mode, to transmit ions over a broad m/z range, or in a narrow bandpass mode, to transmit ions of a selected narrow m/z range. This leads to the use of the mass spectrometer instrument 10 in MS and MS/MS modes. In MS mode, quadrupole 15 is operated as a wide bandpass ion guide. Ions are simply transmitted by all four multipoles 14–17 to time-of-flight (TOF) mass analyzer 18. The TOF mass analyzer is then used to produce a mass spectrum. In MS/MS mode, quadrupole 15 is operated as a narrow bandpass ion guide to select ions of interest. Further, the third multipole—hexapole 16—is operated with a DC offset with respect to quadrupole 15 and is filled with a collision gas. This leads to collisions between the ions of interest and the collision gas and can result in the formation of fragment ions. The fragment ions are guided by hexapole 17 to TOF analyzer 18 which is then used to produce a mass spectrum of these fragment ions.

However, the prior art design of Morris et al., when used in "wide bandpass" mode, is unable to transmit as wide an m/z range as that of Whitehouse et al. described above and certainly not as high an m/z as ions produced by MALDI. The Whitehouse et al. design uses a hexapole. Other prior art designs use an octapole or even a pentapole as the ion guide. Hexapoles, octapoles, and pentapoles are not as good as the Morris design for m/z selection. However, the quadrupole (used in the Morris design) cannot transmit as wide an m/z range as a hexapole, octapole, or pentapole. While some prior art multipoles might be better for transmitting ions of a broad m/z range and others might be better for ion selection, none can transmit high m/z ions such as produced in MALDI (m/z<~$10^5$ Th) (mass-to-charge ratio is less than approximately $10^5$ Thompsons).

The purpose of the present invention is to provide an improved ionization source chamber and ion beam delivery system for use with mass spectrometers. It is a further purpose of the present invention to provide a means and method of operating a mass spectrometer which uses such an ionization source chamber and ion beam delivery system to provide ions to the analyzer and analyze them in a mass analyzer. It is yet a further purpose of the present invention to provide a means and method of operating a mass spectrometer which utilizes the ionization source chamber and ion beam delivery system with a variety of ionization techniques (i.e., ESI, MALDI, etc.).

SUMMARY OF THE INVENTION

One aspect of the present invention is to provide an ionization source chamber and ion beam delivery system which has improved flexibility over prior art sources. The ionization source chamber and ion beam delivery system according to the present invention includes a port onto which an ion production means can be mounted. A variety of ion production means—including electrospray ionization and matrix assisted laser desorption/ionization—may be used. Each ion production means is integrated onto its own flange. To select the desired ion production method, the flange including the means for that particular method is mounted on the port of the ion source.

According to another aspect of the invention, a means is provided whereby one can easily obtain access to the ion transfer optics in an elevated pressure ionization source chamber and ion beam delivery system. That is, a flange can be opened—without demounting any hardware or supporting electronics—to provide easy access to electrodes of the ion transfer optics which need regular cleaning.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF A PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Figure 4:
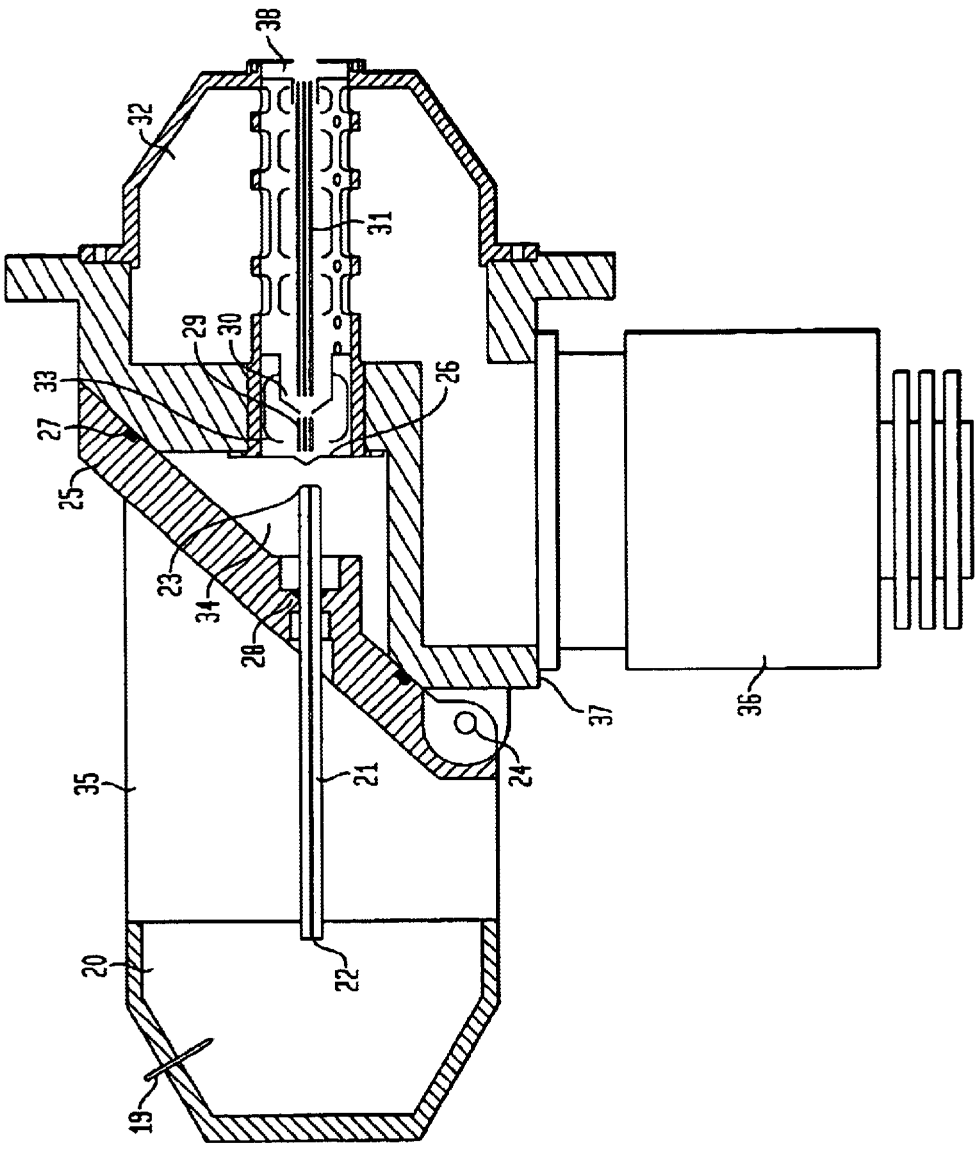
FIG. 4 shows a preferred embodiment of an ionization source chamber and ion beam delivery system according to the present invention in which the ionization source is an ESI ion source.

With regard to FIG. 4, shown is a preferred embodiment of an ionization source chambers and ion beam delivery systems according to the present invention in which the ion production device is an ESI device, shown as spray chamber 20 with spray needle 19. Of course, other types of ion producing devices—i.e., MALDI, APCI, etc.—may be used in accordance with the present invention.

Specifically, the preferred embodiment shown is an ionization source chambers and ion beam delivery systems comprising, among other things, spray chamber 20, first pumping region 34, second pumping region 33, third pumping region 32, transfer region 35, capillary 21, hinge 24, flange 25, pre-hexapole 29, hexapole 31, first skimmer 26, second skimmer 30, pump 36, source block 37, and exit electrodes 38. Pre-hexapole 29 and hexapole 31 are preferably RF hexapoles similar to the multipole ion guides known in the art. During normal operation of the ionization source chamber and ion beam delivery system of the present invention using ESI, sample solution is formed into droplets at atmospheric pressure by spraying the sample solution from spray needle 19 into spray chamber 20. The spray is induced by the application of a high potential between spray needle 19 and capillary entrance 22 within spray chamber 20. Sample droplets from the spray evaporate while in spray chamber 20 leaving behind ionized sample material (i.e., sample ions). These sample ions are accelerated toward capillary entrance 22 by the electric field generated between spray needle 19 and capillary entrance 22. These ions are then transported through capillary 21, from capillary entrance 22 to capillary exit 23. A pressure differential between spray chamber 20—atmospheric pressure—and first pumping region 34—e.g. 1 mbar—causes gas to flow from entrance 22 to exit 23. Ions are entrained in this gas flow at entrance 22 and carried by the gas through capillary 21 to exit 23.

First pumping region 34 is formed by mounting flange 25 on source block 37 where a vacuum tight seal is formed between flange 25 and source block 37 by o-ring 27. Capillary 21 penetrates through a hole in flange 25 where another vacuum tight seal is maintained (i.e., between flange 25 and capillary 21) by o-ring 28. A vacuum is then generated and maintained in first pumping region 34, by, for example, a roughing pump (not shown). The inner diameter and length of capillary 21 and the pumping speed of the roughing pump are selected to provide as high a rate of gas flow through capillary 21 as reasonably possible while maintaining a pressure of about 1 mbar in first transfer region 34. A higher gas flow rate through capillary 21 will result in more efficient ion transport from capillary entrance 22 to exit 23.

Next, first skimmer 26 is placed adjacent to capillary exit 23 within first transfer region 34. An electric potential between capillary exit 23 and first skimmer 26 accelerates the sample ions toward first skimmer 26. A fraction of the sample ions then pass through an opening in first skimmer 26 and into second pumping region 33 where pre-hexapole 29 is positioned to guide the sample ions from first skimmer 26 to second skimmer 30. Second pumping region 33 is pumped to a lower pressure (e.g. $5\times10^{-2}$ mbar) than first pumping region 34 by pump 36. Again, a fraction of the sample ions pass through an opening in second skimmer 30 and into third pumping region 32, which is pumped to a lower pressure (e.g. $3\times10^{-3}$ mbar) than second pumping region 33 by pump 36.

Once in third pumping region 32, the sample ions are guided from second skimmer 30 to exit electrodes 38 by hexapole 31. While in hexapole 31 ions undergo collisions with a gas (i.e., a collisional gas) and are thereby cooled to thermal velocities. The ions then reach exit electrodes 38 and are accelerated from the ionization source chamber and ion beam delivery system into the mass analyzer for subsequent analysis.

DC potentials are applied between capillary exit 23 & first skimmer 26, pre-hexapole 29 & second skimmer 30, and hexapole 31 & exit electrodes 38 in order to optimize (i.e., maximize) the transfer of ions between capillary exit 23 and the mass analyzer adjacent to exit electrodes 38. For example, the potentials which are applied to the above described elements may be as follows: 50V at capillary exit 23, 10V at first skimmer 26, 5V at pre-hexapole 29, 6V at second skimmer 30, 5V at hexapole 31, and between −30V and 30V at exit electrodes 38. Of course, other variations of applied potentials may be used in accordance with the present invention. Numerous factors are considered when determining the optimum potentials to be applied in order to achieve optimum results (i.e., the type of ion production device used, the type of sample being analyzed, the dimensions of the various components used, the type of analysis being performed, etc.).

Figure 5:
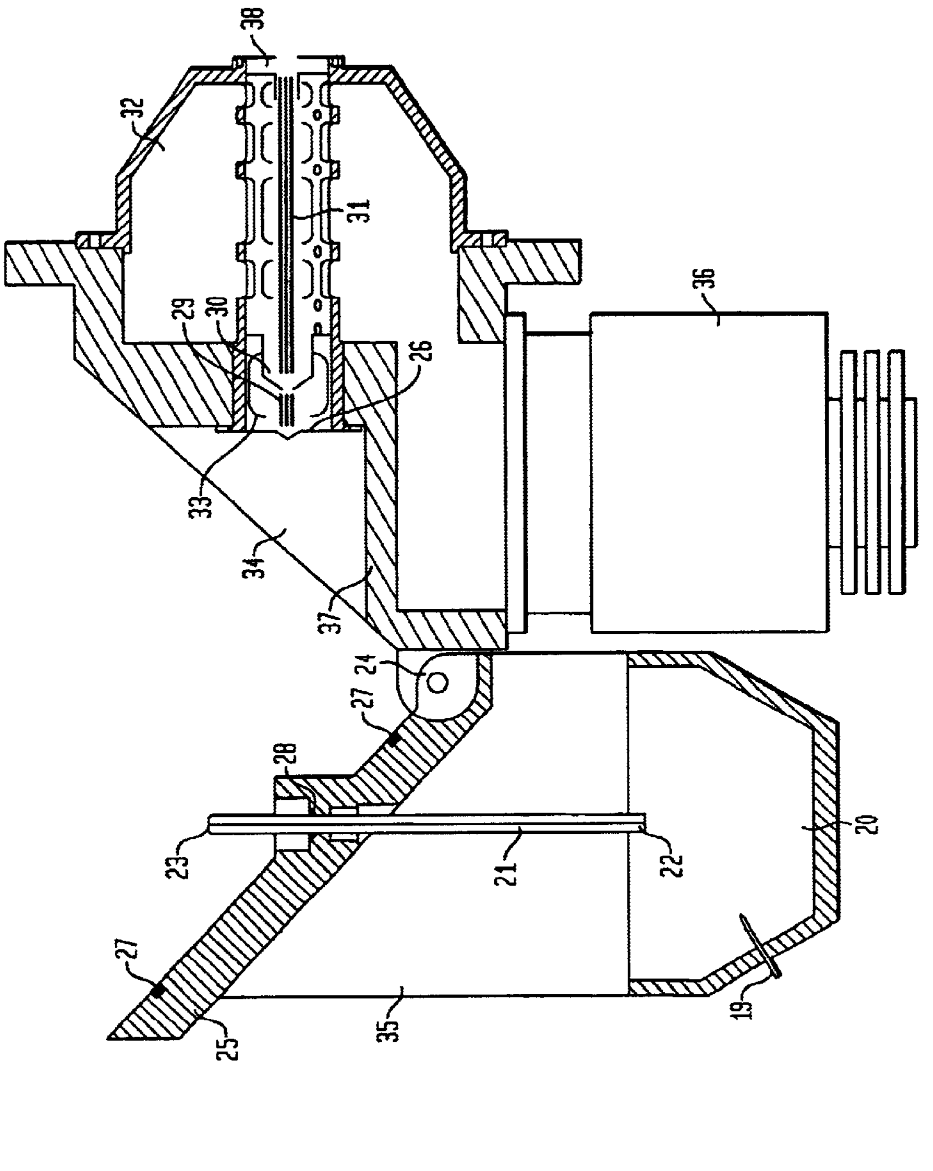
FIG. 5 shows the ionization source chamber and ion beam delivery system of FIG. 4 with the flange/door shown in the open position thereby exposing the exit end of the capillary and the first skimmer.

Turning next to FIG. 5, shown is the ionization source of FIG. 4 in which flange 25 is in the open position thereby exposing capillary exit 23 and first skimmer 26. When pump 36 is turned off and first, second and third pumping regions (35, 33, and 32) are brought to atmospheric pressure, the airtight seal created by o-ring seal 27 between flange 25 and source block 37 can be readily broken and flange 25, including spray chamber 20 (or some other ion producing device), can be rotated to an "open" position on hinge 24. This provides easy access to capillary exit 23 and first skimmer 26 within first transfer region 34. During the course of normal operation of the ionization source according to the present invention using an ESI source (as shown in FIGS. 4–5), for example, capillary 21, which includes capillary entrance 22 and capillary exit 23, and first skimmer 26 may become coated with a particular analyte or other contaminating material(s). This coating may become charged when exposed to an ion beam and as a result, repel the ions. This leads to a loss in the efficiency of transmission of ions through the source and to the mass analyzer. To correct this problem, capillary 23 and skimmer 26 must be cleaned. Thus, the present invention provides efficient access to capillary exit 23 and first skimmer 26 to allow the removal of any contaminating material. Also, periodic replacement or repair of certain components can be accomplished in an efficient manner, thereby saving both time and money. Having spray chamber 20 mounted on flange 25 is valuable for providing easy access to the internal components (i.e., capillary 21, first skimmer 26, etc.) so that they may readily be cleaned, repaired or replaced.

Figure 1:
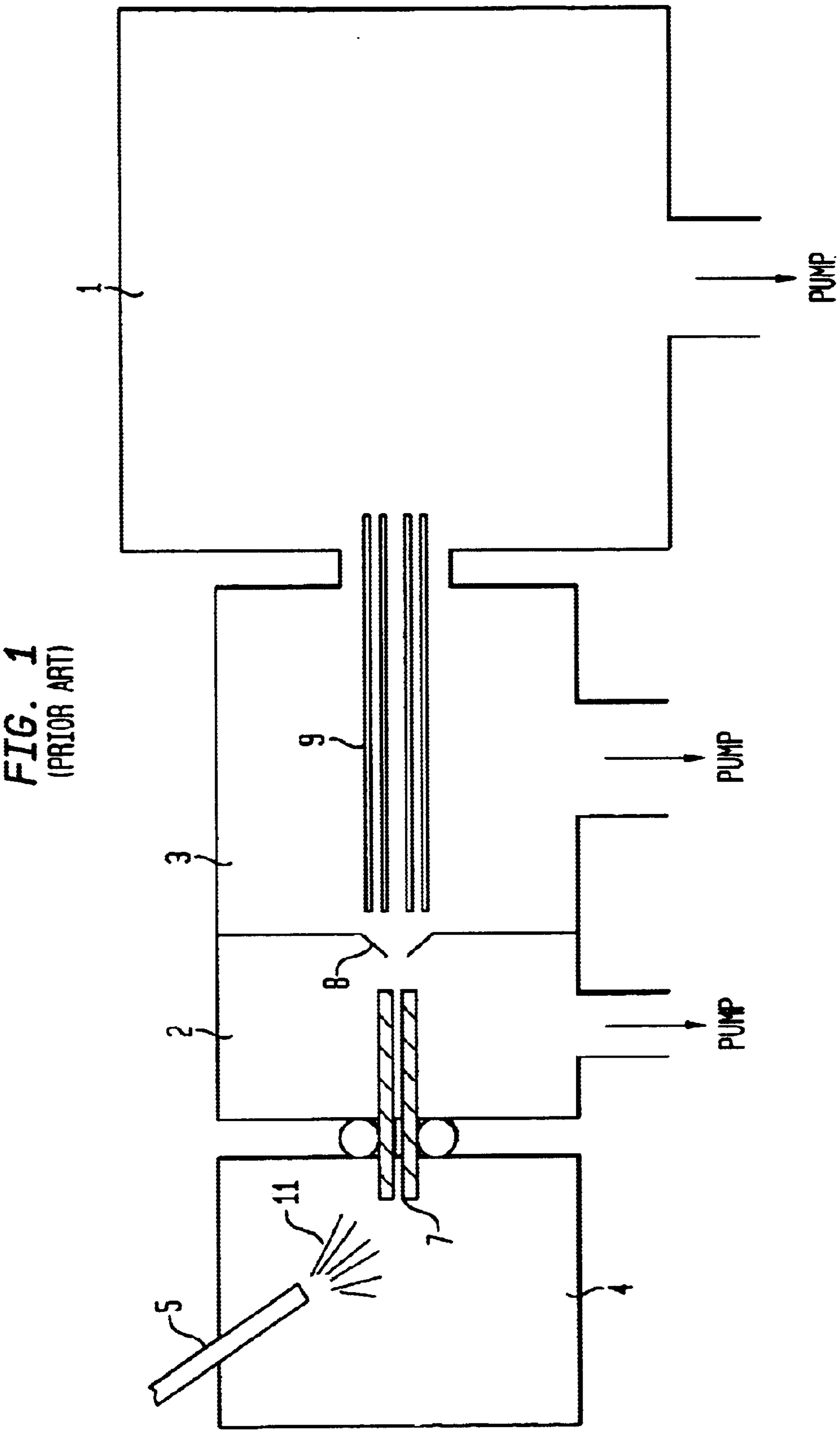
FIG. 1 (PRIOR ART)
FIG. 1 depicts a conventional mass analyzer using an atmospheric pressure ionization (API) ion source to generate ions from a sample for subsequent analysis.
Figure 2:
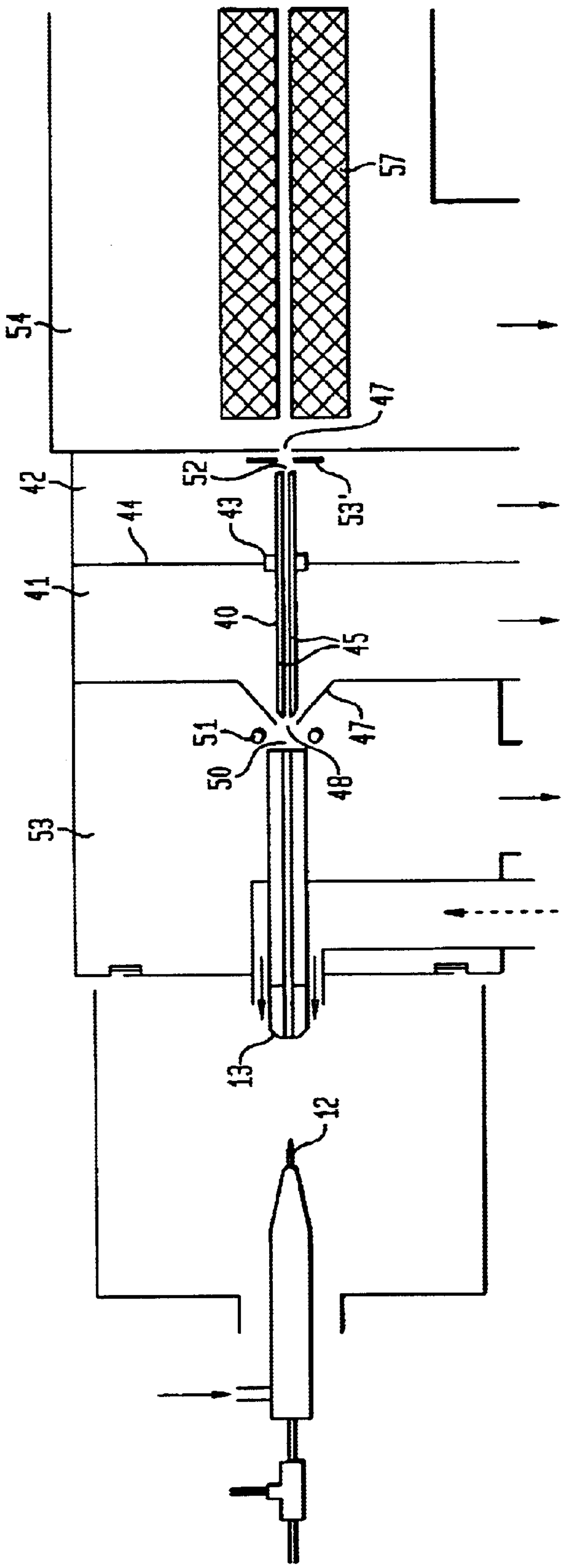
FIG. 2 (PRIOR ART)
FIG. 2 shows the prior art electrospray ionization (ESI) ion source of Whitehouse et al.
Figure 3:
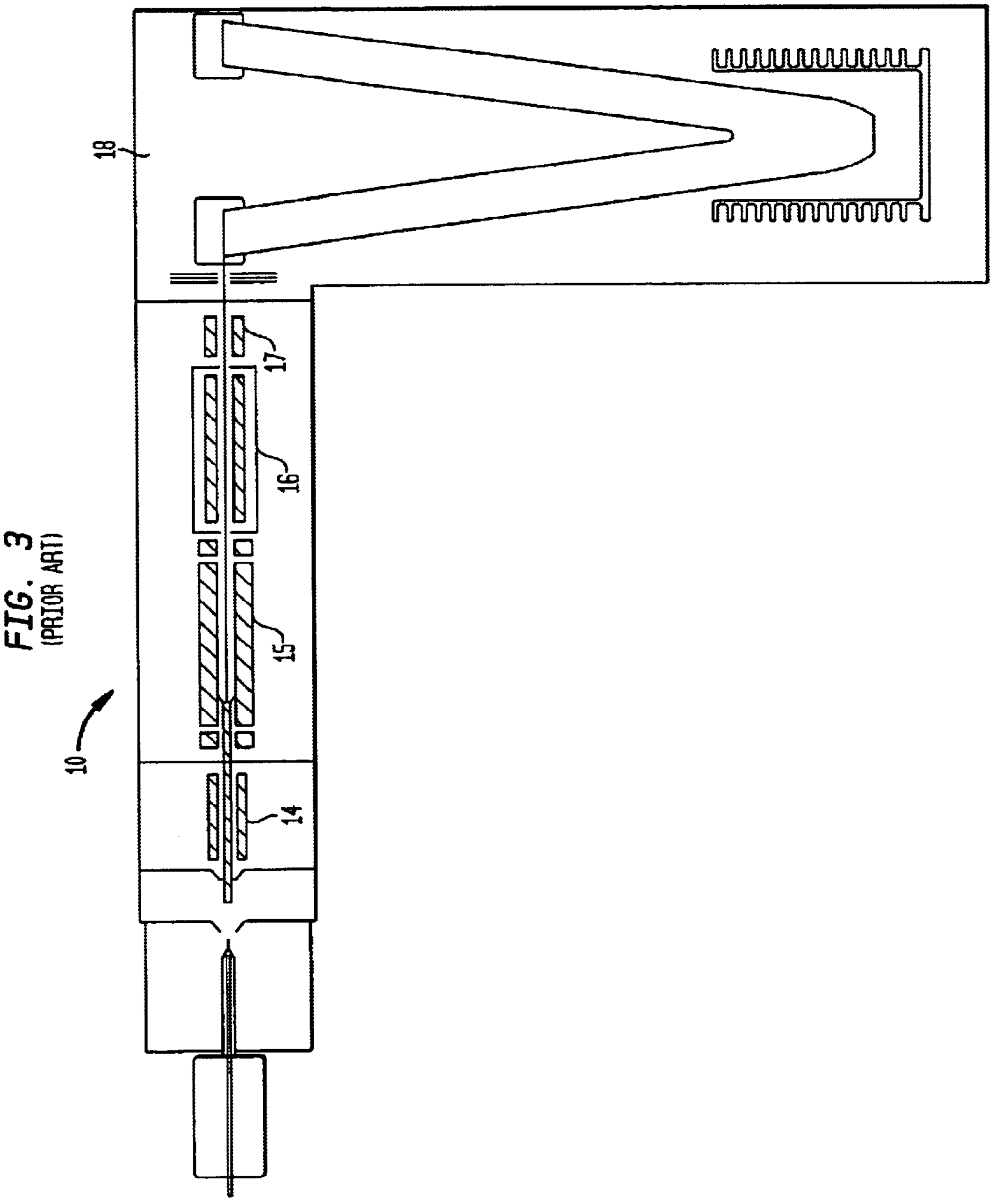
FIG. 3 (PRIOR ART)
FIG. 3 shows the prior art ESI mass spectrometer of Morris et al.

Other embodiments of the present invention, of course, are quite apparent. For instance, spray chamber 20 may be mounted onto flange 25 by any of a number of different mounting techniques (i.e., bolted, clamped, latched, screwed, etc.). In addition, pre-hexapole 29 and/or hexapole 31 might be replaced with some other form of multipole device like, for example, a quadrupole, a pentapole, a octapole, etc. Alternatively, pre-hexapole 29 and/or hexapole 31 might be replaced with a multitude of multipole devices in a manner similar to the Morris et al. shown in FIG. 3. Also, hinge 24 may take a variety of forms. For example, as shown, hinge 24 may be positioned such that flange 25 can be rotated downward to the "open" position. Alternatively, hinge 24 may be positioned at the upper end of flange 25 such that flange 25 can be rotated upward (not shown) to the "open" position. Similarly, hinge 24 may be positioned on either side of flange 25 such that flange 25 can be rotated to the left or right (not shown) to the "open" position. Also, hinge 24 may be a "lift-off" hinge (not shown).

In any of the above embodiments described above, flange 25 is removable (or replaceable). That is, if pump 36 (or pumps, if more than one are used) is turned off and regions 32, 33 and 34 are brought to atmospheric pressure, flange 25 of FIGS. 4 and 5 can be removed entirely from source block 37 by breaking the seal at o-ring 27 and lifting the flange off hinge 24. Flange 25 may then be replaced by any other similar flange containing a similar, or different, ion generating device, such as the MALDI ion source shown in FIG. 6.

Figure 6:
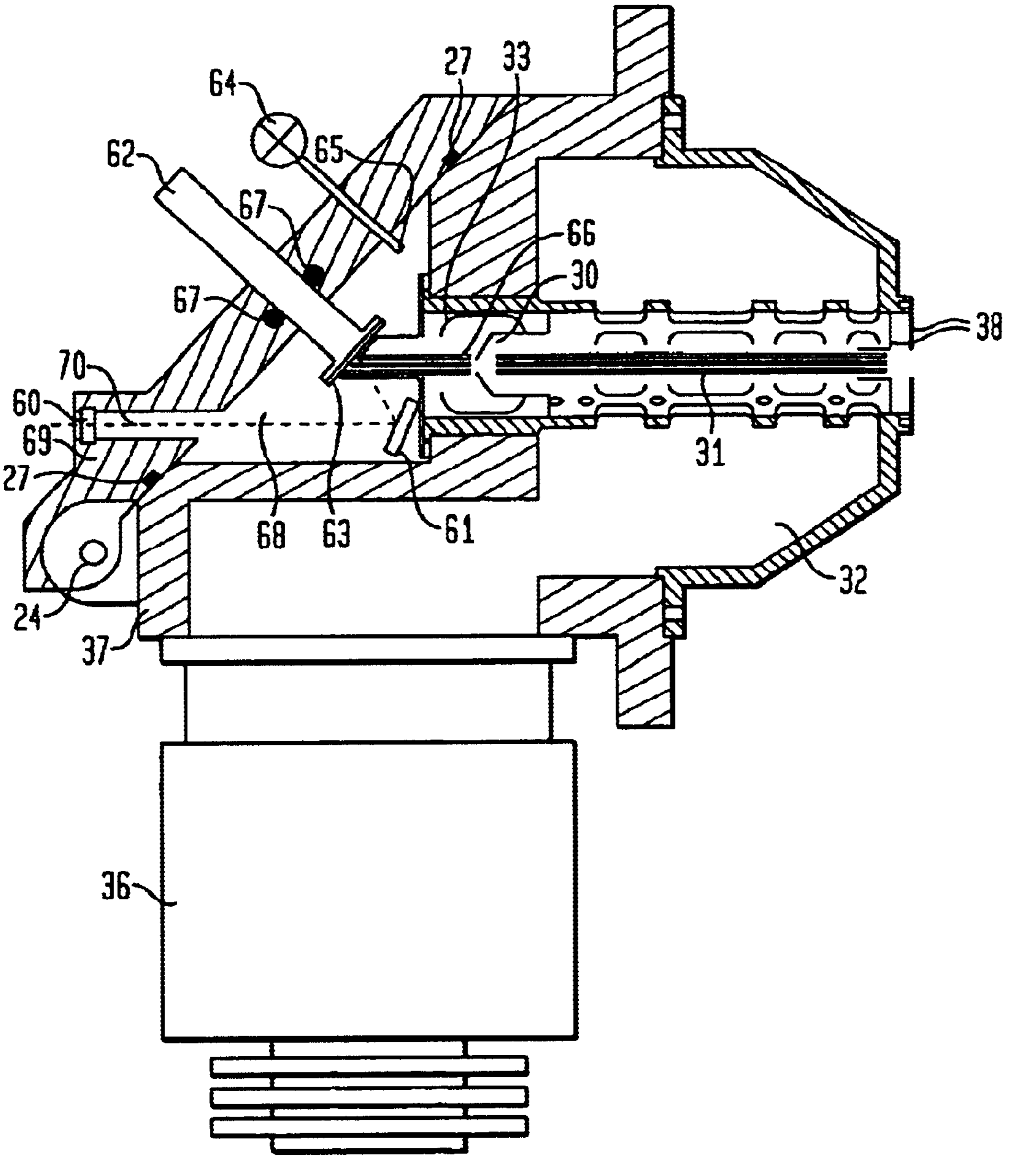
FIG. 6 shows a preferred embodiment of an ionization source chamber and ion beam delivery system according to the present invention in which the ionization source is a MALDI ion source.

Turning now to FIG. 6, shown is an alternate embodiment of an ionization source according to the present invention in which the ion generating device is matrix-assisted laser desorption ionization (MALDI). For example, in FIG. 6, flange 69 includes a MALDI ion production device. In this embodiment, sample probe 62 projects through flange 69 into first pumping region 68 such that probe head 63 is positioned adjacent to the entrance to prehexapole 66. O-ring 67 is located between probe 62 and flange 69 to maintain an airtight (or vacuum tight) seal in first pumping region 68.

The vacuum seal of first pumping region 68 is created by the connection of source block 37 and flange 69. O-ring 27 is positioned between source block 37 and flange 69 to ensure the airtight or vacuum seal is maintained in pumping region 68. In operation, first pumping region 68 is evacuated, for example, to a pressure of $10^{-2}$ mbar. Alternatively, gas (e.g., collisional gas) may be introduced into first pumping region 68 either continuously or in pulses via gas line 65 and valve 64. The pressure in first pumping region 68 is maintained such that ions produced via the MALDI process may be cooled. That is, in the MALDI process used in accordance with this embodiment of the present invention, the ions are first desorbed from probe head 63 when the laser light hits the sample material thereon. Initially, these ions have a high kinetic energy (e.g., a velocity of 750 m/s). By colliding with gas near the sample surface—or any gas in first pumping region 68—the ions will lose velocity and therefore the ions kinetic energy will be reduced. Thus, in effect, the ions will be cooled to the temperature of the gas before entering pre-hexapole 66 for transportation to the mass analyzer.

Preferably, probe head 63 lies close to pre-hexapole 66 such that, during analysis, the samples (with matrix) that are deposited on probe head 63 are adjacent to the entrance to pre-hexapole 66. Also preferably, sample probe 62 and probe head 63 are cylindrically symmetric such that they can be rotated during operation. Such rotation permits samples to be rotated into and out of laser beam path 70, thereby allowing ionization (and subsequently analysis) of different samples without having to turn off pump 36, open flange 69, and remove sample probe 62 in order to change the sample to be analyzed.

As with conventional MALDI techniques, laser light is used to ionize a sample in a matrix. As shown in FIG. 6, the laser beam for the MALDI process follows beam path 70 into the ionization source through window 60 whereupon it reaches mirror 60 which is positioned such that the laser beam is redirected to probe head 63 and the sample located thereon. After being reflected by mirror 61, the laser beam passes between the poles of pre-hexapole 66 before reaching probe head 63. Thus, pre-hexapole 66 must be oriented such that the electrodes comprising pre-hexapole 66 do not interfere with path 70 of the laser beam. Then, when probe 62 is properly rotated, the sample material located thereon will coincide with the laser beam whose light induces desorption and ionization of the sample material.

Once the ions have been desorbed from the sample material on probe head 63 and have been cooled by collisions with the gas in first pumping region 68, the ions are accelerated into pre-hexapole 66 by an electric field generated by the application of a potential difference between probe head 63 and pre-hexapole 66. For example, a DC potential difference of 100 V may be applied between probe head and pre-hexapole 66. This potential difference causes the ions to be accelerated away from probe head 63 and toward pre-hexapole 66. Optionally, in addition to the DC potential difference applied as described above, an RF potential may also be applied to hexapole 66 to further optimize transfer (or acceleration) of the ions into hexapole 66 as well as guide the ions therethrough.

Next, pre-hexapole 66 guides the sample ions from probe head 63 to skimmer 30. Second pumping region 32 is pumped to a lower pressure (e.g., $3\times10^{-2}$ mbar) than first pumping region 68, also by pump 36. This pressure differential aids in the flow of the sample ions through pre-hexapole 66 from first pumping region 68 to second pumping region 32. As the sample ions exit pre-hexapole 66, they reach skimmer 30, wherein only a fraction of the sample ions pass through an opening in skimmer 30. Once through skimmer 30, the sample ions are guided from skimmer 30 to exit electrodes 38 by hexapole 31. While in hexapole 31 the sample ions again undergo collisions with a gas (e.g., a collisional gas) and are again cooled to thermal velocities. The ions then reach exit electrodes 38 and are accelerated from the ionization source chamber and ion beam delivery system into the mass analyzer for subsequent analysis.

Again, pre-hexapole 66 and hexapole 31 are preferably RF hexapoles similar in form and function to multipole ion guides known in the art. DC potentials are applied between probe head 63 & pre-hexapole 66, pre-hexapole 66 & skimmer 30, and hexapole 31 & exit electrodes 38 in order to optimize (i.e., maximize) the transfer of sample ions from probe head 63 and the mass analyzer adjacent to exit electrodes 38.

In addition to the ESI and MALDI ion producing devices shown in FIGS. 4–6 and described above, it is envisioned that other ion generating devices or means may be used without departing from the spirit of the invention. For example, some of the ion production means include: electron impact (EI); chemical ionization (CI); particle bombardment (e.g., fast atom bombardment (FAB) or ion bombardment (SIMS)); etc.

Also, alternative embodiments of the ion transfer elements of FIG. 4 (i.e., first skimmer 26, pre-hexapole 29, second skimmer 30, hexapole 31, and exit electrodes 38) may be used. For example, instead of hexapole 31, one might use a quadrupole, pentapole, octapole, or other multipole device. Similarly instead of hexapole 29 one might use some other multipole device. Also, skimmers 26 and 30 might be flat plates instead of cone shaped electrodes.

Although the ionization source chamber and ion beam delivery system of the invention has been described and shown as having the plane of the connection of flange 25 and source block 30 (FIGS. 4–5) at a specific angle, the source may be designed such that this connection of flange 25 and source block 30 is any other angle without affecting the spirit of the invention. Specifically, the angle shown is approximately 45°. However, this angle may be any angle from 0° to 90° (i.e., such that capillary 21 is coaxial with the downstream hexapoles (0°) or such that capillary 21 is perpendicular to the downstream hexapoles (90°))

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. An ionization source chamber for the production of sample ions to be introduced into a mass spectrometer, wherein said ionization source chamber comprises:

a source housing;

a rotatably moveable sealing mechanism integrally and removably connected to said housing with lateral seal, said housing and a first side of said sealing mechanism forming a first pumping region, and said sealing mechanism having at least one opening therethrough;

a source cover attached to a second side of said sealing mechanism, said source cover and said second side of said sealing mechanism forming an ionization region for producing ions from a sample; and at least one ion transfer device positioned with lateral seal in said opening of said sealing mechanism such that said ionization region communicates with said first pumping region;

wherein said source housing comprises a second pumping region adjacent to and in communication with said first pumping region such that ions may be transferred from said first pumping region to said mass spectrometer, said second pumping region being maintained at a lower pressure than said first pumping region.

2. A source chamber according to claim 1, wherein said ionization region includes an ion production device selected from the group consisting of an elevated pressure ionization source, an ESI source, an elevated pressure laser desorption ionization source, a MALDI source, a glow discharge ionization source, a chemical ionization source, an atmospheric pressure chemical ionization source, an inductively coupled plasma ionization source, an elevated pressure laser desorption chemical ionization source and an elevated pressure MALDI chemical ionization source.

3. A source chamber according to claim 1, wherein said ion transfer device is a capillary.

4. A source chamber according to claim 1, wherein an ion guide is positioned within said source housing.

5. A source chamber according to claim 4, wherein said ion guide is selected from the group consisting of a multipole, a quadrupole, a hexapole and an octapole.

6. A source chamber according to claim 1, wherein said apparatus further comprises additional ion transfer devices for transferring said ions from said ionization region to said mass spectrometer.

7. A source chamber according to claim 6, wherein said ion transfer devices comprise at least one capillary and at least one multipole.

8. A source chamber according to claim 7, wherein said multipole is selected from the group consisting of a quadrupole, a hexapole, and an octapole.

9. A source chamber according to claim 7, wherein said capillary is mounted on said sealing mechanism and said multipole is positioned within said second pumping region.

10. A source chamber according to claim 1, wherein a capillary is mounted on said sealing mechanism, and at least one multipole, at least one skimmer and at least one pair of electrodes are positioned within said second pumping region.

11. A source chamber according to claim 10, wherein said capillary transfers said ions from said ionization region to said first pumping region, said at least one multipole guides said ions through said second pumping region, said at least one skimmer focuses said ions, and said at least one pair of electrodes accelerates said ions into said mass spectrometer.

12. A source chamber according to claim 1, wherein said source chamber further comprises at least one gas transfer device for assisting in the transfer of said ions through said ion transfer devices.

13. A source chamber according to claim 12, wherein said at least one gas transfer device comprises ion optic elements.

14. A source chamber according to claim 13, wherein at least one of said gas transport elements are mounted on said sealing mechanism.

15. A source chamber according to claim 13, wherein at least one of said gas transport elements are positioned in said first pumping region.

16. A source chamber according to claim 1, wherein said sealing mechanism is mounted to said source housing via a hinge and latch.

17. A source chamber according to claim 16, wherein said hinge is a "lift-off" hinge.

18. A source chamber according to claim 1, wherein said ionization region is at or near atmospheric pressure.

19. A mass spectrometer system comprising:

an ionization source chamber comprising a housing, a removable flange having means for providing lateral seal with said housing when in a first position, a means for connecting a pump, and first and second pressure regions separated by a pumping restriction;

means for producing ions from a sample material and introducing said ions into said ionization source chamber; and a plurality of means for guiding said ions from said ion generating means through said first and second pressure regions to a mass analyzer for subsequent analysis;

wherein said source chamber has a port for mounting said means for generating ions therein such that said ions may be produced in said first pressure region; and wherein said flange is movably attached to said housing such that in said first position said means for generating and one of said means for guiding ions are in alignment at an entrance end of said means for guiding within said first pressure region, and in a second position said means for generating and said means for guiding are readily accessible and exposed to atmospheric pressure while said second pressure region is maintained at a pressure lower than atmospheric by said pumping restriction.

20. A system according to claim 19, wherein said ion generating means is selected from the group consisting of an elevated pressure ionization source, an ESI source, an elevated pressure laser desorption ionization source, a MALDI source, a glow discharge ionization source, a chemical ionization source, an atmospheric pressure chemical ionization source, an inductively coupled plasma ionization source, an elevated pressure laser desorption chemical ionization source and an elevated pressure MALDI chemical ionization source.

21. A system according to claim 19, wherein said first pressure region comprises at least one said means for guiding ions.

22. A system according to claim 19, wherein said second pressure region comprises at least one said means for guiding ions.

23. A system according to claim 19, wherein said means for guiding ions comprise at least one multipole.

24. A system according to claim 23, wherein said means for guiding is mounted within said source chamber such that said means for guiding extends from said first pressure region into said second pressure region.

25. A system according to claim 19, wherein said means for guiding are selected from the group consisting of a multipole ion guide, a stacked ring electrode ion guide, a skimmer, a capillary, a multideflector, a postselector and electrodes.

26. A system according to claim 25, wherein said at least one multipole, said at least one skimmer and said at least one pair of electrodes are mounted within said vacuum region.

27. A system according to claim 25, wherein said at least one multipole guides said ions through said at least one vacuum region, said at least one skimmer focuses sad ions in said at least one vacuum region, and said at least one pair of electrodes accelerates said ions from said at least one vacuum region into said mass analyzer.

28. A system according to claim 19, wherein said system further comprises at least one gas transfer device positioned within said source chamber for assisting in the transfer of said ions through said transfer devices.

29. A system according to claim 28, wherein said at least one gas transfer device comprises ion optic elements.

30. A system according to claim 28, wherein said at least one gas transfer device comprises gas transport elements.

31. A system according to claim 30, wherein at least one of said gas transport elements are mounted on said flange.

32. A system according to claim 30, wherein at least one of said gas transport elements are mounted in said pumping region.

33. A system according to claim 19, wherein said flange is mounted to said pumping region via a hinge and latch.

34. A system according to claim 33, wherein said hinge is a "lift-off" hinge.

35. A system according to claim 19, wherein said first pressure region is at or near atmospheric pressure.

36. A method for producing ions from a sample and transporting said ions for subsequent mass spectrometric analysis, said method comprising the steps of:

producing ions from a sample in a region maintained substantially at atmospheric pressure;

transferring said ions from said atmospheric pressure region into a first pumping region, said first pumping region formed by sealed interconnection of a hingedly attached flange and an ionization source housing such that a first means for transferring said ions is securely mounted with lateral seal in and through said flange such that an exit end of said first means for transferring is in alignment with an entrance end of a second means for transferring said ions, and said first pumping region being maintained at a pressure lower than atmospheric pressure;

transferring said ions from said first pumping region into and through a second pumping region within said ionization source housing, said second pumping region being separated from and maintained at a lower pressure than said first pumping region by a first pumping restriction;

transferring said ions from said second pumping region into and through a third pumping region within said ionization source housing, said third pumping region being separated from and maintained at a lower pressure than said second pumping region by a second pumping restriction; and introducing said ions into a mass analyzer for analysis;

wherein said flange in a second position provides access to said first pumping region and said first means for transferring while said second and third pressure regions are maintained at said lower pressures.

37. An apparatus according to claim 36, wherein said ions are produced by an ion production means selected from the group consisting of an elevated pressure ionization source, an ESI source, an elevated pressure laser desorption ionization source, a MALDI source, a glow discharge ionization source, a chemical ionization source, an atmospheric pressure chemical ionization source, an inductively coupled plasma ionization source, an elevated pressure laser desorption chemical ionization source and an elevated pressure MALDI chemical ionization source.

38. A method according to claim 36, wherein said first pumping region is maintained at a pressure on the order of 1 millibar.

39. A method according to claim 36, wherein said second pumping region is maintained at a pressure on the order of $10^{-2}$ millibars.

40. A method according to claim 36, wherein said third pumping region is maintained at a pressure on the order of $10^{-3}$ millibars.

41. A method according to claim 36, wherein said first means for transferring is a capillary.

42. A method according to claim 36, wherein said second means for transferring is an ion guide selected from the group consisting of a quadrupole ion guide, a hexapole ion guide, an octapole ion guide, a multipole ion guide, a stacked ring electrode ion guide, a capillary, a multideflector, a postselector and electrodes.

43. A method according to claim 36, wherein said third means for transferring is an ion guide selected from the group consisting of a quadrupole ion guide, a hexapole ion guide, an octapole ion guide, a multipole ion guide, a stacked ring electrode ion guide, a capillary, a multideflector, a postselector and electrodes.

44. A method according to claim 36, said method further comprising the step of:

selecting certain of said ions for introduction into said mass analyzer for mass analysis.

45. A method according to claim 36, wherein said first and second means for transferring are one and the same such that said second and third pumping regions are sharing one means for transferring.

46. A method according to claim 36, wherein said first means for transferring extends through said first pumping restriction into said third pumping region.

47. A method according to claim 36, said method further comprising the step of:

providing a gas transfer device for assisting with said transferring of said ions through said first means for transferring.

48. A method according to claim 47, wherein said gas transfer device is mounted on said flange.

49. A method according to claim 36, said method further comprising the step of:

providing a gas transfer device for assisting with said transferring of said ions through said second means for transferring.

50. A method according to claim 36, said method further comprising the step of:

providing a gas transfer device for assisting with said transferring of said ions through said third means for transferring.

51. A method according to claim 36, wherein a hinge and latch assembly mount said flange to said housing, and an o-ring positioned on said flange provides said sealed interconnection.

* * * * *